(12) United States Patent
Herbert

(10) Patent No.: US 6,979,982 B2
(45) Date of Patent: Dec. 27, 2005

(54) SWITCHED-CURRENT POWER CONVERTER

(76) Inventor: Edward Herbert, 1 Dyer Cemetery Rd., Canton, CT (US) 06019-2029

(*) Notice: Subject to any disclaimer, the term of this patent is extended or adjusted under 35 U.S.C. 154(b) by 63 days.

(21) Appl. No.: 10/709,484

(22) Filed: May 8, 2004

(65) Prior Publication Data

US 2004/0232899 A1 Nov. 25, 2004

Related U.S. Application Data

(60) Provisional application No. 60/481,414, filed on Sep. 24, 2003, provisional application No. 60/481,022, filed on Jun. 25, 2003, provisional application No. 60/479,706, filed on Jun. 19, 2003, provisional application No. 60/477,417, filed on Jun. 9, 2003, provisional application No. 60/473,075, filed on May 23, 2003.

(51) Int. Cl.$^7$ ................................. G05F 1/44
(52) U.S. Cl. ...................... 323/272; 323/284
(58) Field of Search ................. 323/225, 266, 323/268, 272, 282, 284

(56) References Cited

U.S. PATENT DOCUMENTS 6,121,761 A * 9/2000 Herbert ...................... 323/282

* cited by examiner

*Primary Examiner*—Gary L Laxton

(57) ABSTRACT

In a switched-current power converter, a plurality of constant current sources provide equal currents to a plurality of switch pairs that may direct the several currents either to the return or to the output capacitors and the load. In another embodiment of the invention, internal switches may short circuit the several current sources and a plurality of switches may switch the several currents to the output capacitor and the load when the internal switches are not short circuits. A voltage control circuit is shown in which a resistor ladder network is the references for a number of comparators which directly control the plurality of switches. An alternative voltage control circuit uses two comparators and an up-down counter to control the switches.

10 Claims, 12 Drawing Sheets

SWITCHED-CURRENT POWER CONVERTER

CROSS REFERENCE TO RELATED APPLICATIONS

This application claims priority to the following provisional patent applications: Ser. No. 60/473,075 "Switched-current Power Converter", filed 23 May, 2003; Ser. No. 60/477,417 "Fast Transition Power Converter for Processors Using Switched-Current and Switched Charge", filed 9 Jun., 2003; Ser. No. 60/479,706 "Parallel Current Sources for Switched-Current Power Converters", filed 19 Jun., 2003; Ser. No. 60/481,022 "Voltage Control for Switched-Current Power Converters", filed 25 Jun., 2003; and Ser. No. 60/481,414 "Voltage Control for Switched-Current Power Converters, filed 24 Sept., 2003. U.S. Pat. No. 4,665,357, "Flat Matrix Power Supply", issued on May 12, 1987 and U.S. Pat. No. 6,121,761 "Fast Transition Power Supply", Edward Herbert, issued on Sept. 19, 2000 are cited as references.

BACKGROUND OF INVENTION

This invention relates to power converters, particularly power converters having a very fast dynamic response to changes in load. Power converters for processors are an example of power converters that require very fast dynamic response, as the processor can change state very rapidly, going from idle current to full load in a few machine cycles, and vice versa. Poor dynamic response is a problem in many other general purpose power supplies as well, whenever fast changes in load occur. An example is the problem of paralleling power converters and hot swapping them, where the loads change instantly as units are unplugged and replaced.

SUMMARY OF INVENTION

The switched-current power converter minimizes the change of energy in the inductors and the power distribution bus by making their currents constant. With no di/dt in these components, many of the problems of conventional power supplies are solved.

In one embodiment of the switched-current power converter, a number of constant current sources provide constant equal currents to a number of wires, which could be a ribbon cable or traces on a printed wiring board. At the load, a plurality of switch pairs direct any number of the currents to return or to the output capacitor and the load. Because the currents are switched at the end of the power bus, right at the load, there is no di/dt in the circuit until right at the output capacitor.

The dynamic response to changes in load current can be nearly instantaneous, just as fast as the switches can switch. As an extreme example, if all terminal switches are switched from ground to the output and then back to ground, the switched-current power converter can go from zero load to full load and back to zero load nearly instantly, with no di/dt in the power distribution bus or the power source circuitry.

It is often desirable to minimize the amount of circuitry that must be placed near the processor, because space is at a premium. It is also desirable to minimize the power dissipation near the processor. Modern switches (MOSFETs) have a very low forward drop, so the terminal switching circuits near the processor do not dissipate much power at all despite the circulating current. Conduction losses are kept low by providing adequate total conductor area for the dc currents.

Ac effects (penetration depth and proximity effects) are not a factor in the power bus, as it operates at a constant current. The switched lines will have step voltage changes from zero to the output voltage Vo (typically about 1 volt, for a processor) to zero. With the very low output voltage and the very low capacitance of the wires, this is negligible compared to the large energy changes in present power converters when currents must change rapidly.

Because the energy of the power bus is nearly constant, its length and placement are much less critical, and it is not as serious a source of noise. Therefor the source of the power can be placed away from the processor. A simple ribbon connector can carry the parallel constant current lines to the terminal switches.

The equal parallel currents are easily generated with a matrix transformer, as that is the matrix transformer's natural output. The primary is excited with a 100% duty cycle driver, probably a push-pull circuit, though full bridge and half bridge would be alternatives. If the primary circuit is driven by a constant current power source, then all of the secondary outputs will be equal constant current sources.

A buck converter is a suitable constant current input power source for the switched-current power converter, as it is naturally a current driver. Because the current is constant, the inductor can be fairly large, for low ripple, and the value of its inductance, as long as it is adequate, makes no difference to the overall circuit dynamic response of the switched-current power converter. The peak current into the buck converter is constant and equals the current in one of the parallel power bus lines, 1/m times the total output current at full load if there are m lines.

The control of the constant current buck converter input section is very simple: It can be a hysteretic control. Alternatively, it can be a current mode control, with a fixed current reference.

The simplest control for the switched-current power converter senses the capacitor voltage, and turns on more or fewer switches depending on the error. Preferably, there would be a staggered switching, to distribute the switch losses and the core losses. One possible control algorithm would have the switches turn on and off in a fixed sequence. If the output voltage is too low, the turn on sequence advances so more switches are turned on. If the output voltage is too high, the turn off sequence advances so fewer switches are turned on. As the control modulates to keep the output voltage constant, the sequences will advance in step, repeating cyclically, so that the losses in the switches and cores will be distributed.

The switched-current power converter is suitable for stand alone or distributed power supplies as well. For a stand alone power supply, all of the components are in one package. A single buck converter power source can power more than one voltage output just by putting matrix transformer stages in series with the number of transformer modules proportional to the current rating of the various outputs.

The power converter is inherently incapable of supplying a current overload as long as the constant current input is protected. An overload will simply drag the voltage down at maximum load.

Another embodiment of the invention incorporates switched-charge circuitry, so that the output voltage can step nearly instantly and precisely.

DETAILED DESCRIPTION

Figure 1:
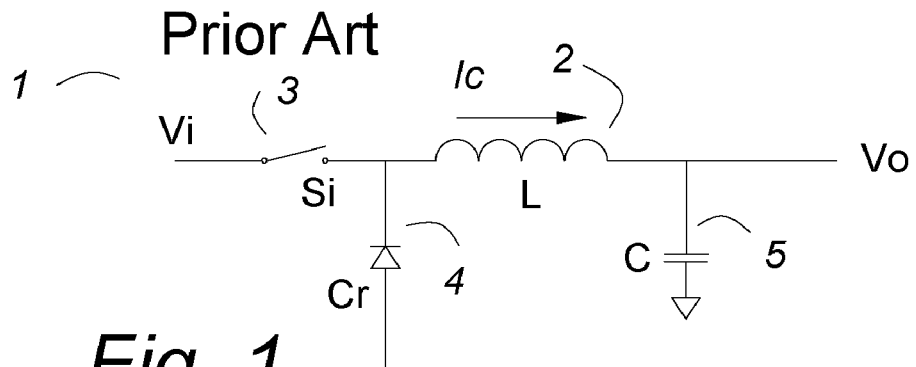
FIG. 1 shows a prior art buck converter.

FIG. 1 shows a prior art buck converter 1. A switch 3 is pulse width modulated to provide an average voltage equal to the duty cycle times the input voltage Vi to an inductor 2. The inductor 2 and a capacitor 5 cooperate as an output filter to provide a smooth output voltage Vo. A catch diode 4 conducts current into the inductor 2 when the switch 3 is open. In modern power converters, the switch 3 and the catch diode 4 may be MOSFETs.

Figure 2:
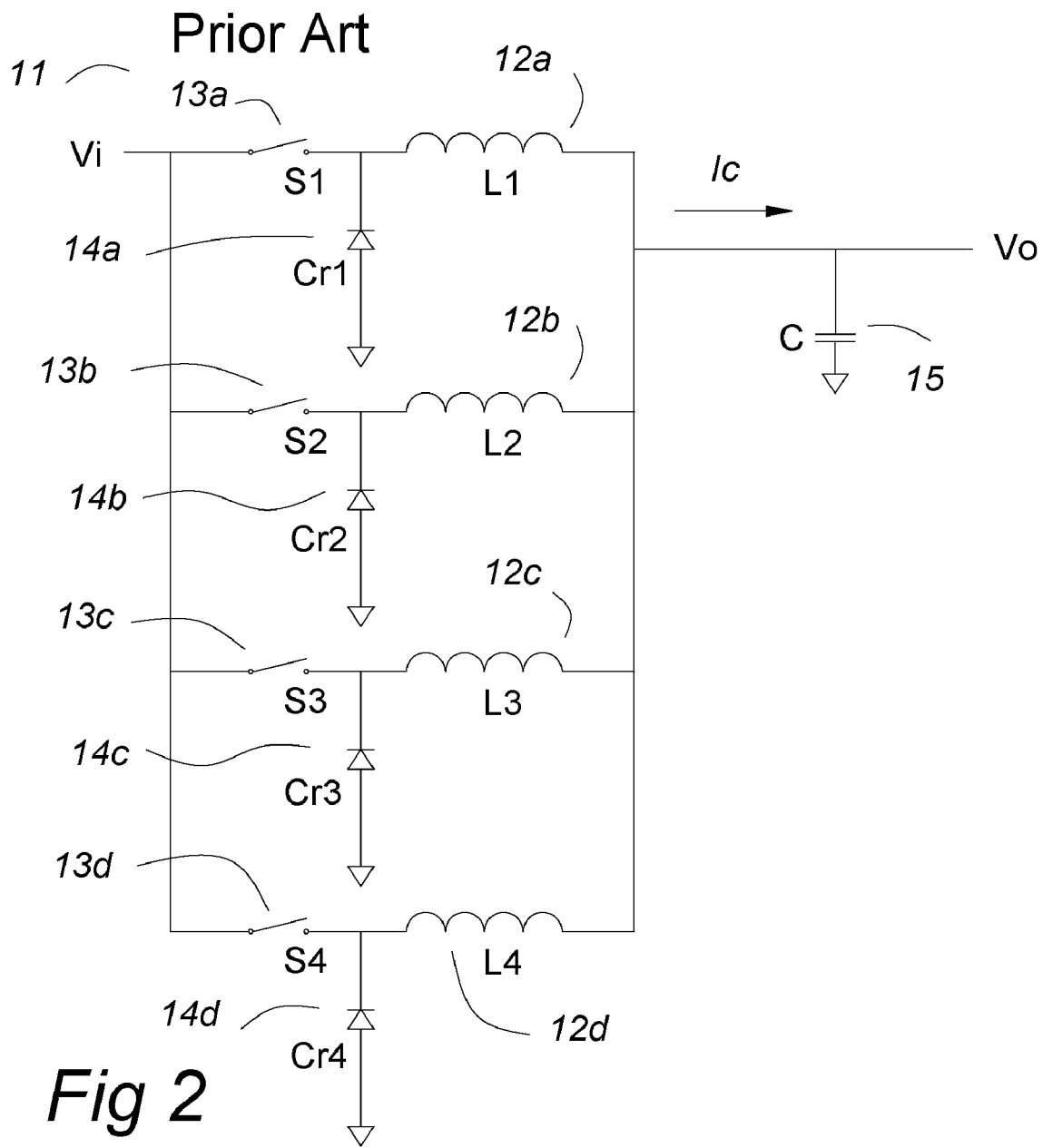
FIG. 2 shows a prior art multi-phase buck converter.

FIG. 2 shows a prior art multi-phase buck converter 11. A plurality of input switches 13a–13d are pulse width modulated to provide an average voltage equal to the duty cycle times the input voltage V1 to a plurality of inductors 12a–12d. The plurality of inductors 12a–12d and an output capacitor 15 cooperate as an output filter to provide a smooth output voltage Vo. A plurality of catch diodes 14a–14d conduct currents into the plurality of inductors 12a–12d when any of the plurality of switches 13a–13d are open. In modern power converters, the switches 13a–13d and the catch diodes 14a–14d may be MOSFETs, and the duty cycles of the MOSFETs are precisely controlled by sophisticated controller integrated circuits.

Figure 3:
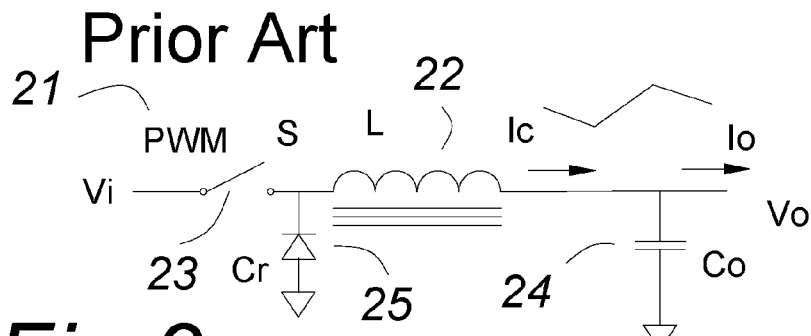
FIG. 3 shows that the current in a prior art buck converter must ramp up slowly, because the current cannot change rapidly in an inductor.

FIG. 3 shows that no matter how high the frequency of operation, and no matter how sophisticated the control, buck converter 21 has the inherent limitation that a current Ic cannot increase and decrease rapidly in an inductor 22. When an input switch 23 is open, the voltage on the input side of the inductor 22 is determined by the forward drop of a catch diode 25. In a modern buck converter, the catch diode 25 will be a MOSFET having a very low forward voltage drop, so the voltage on the input of the inductor 22 is essentially zero. Therefore, the current Ic will decrease at a rate di/dt equal to the output voltage Vo (stored on a capacitor 24) divided by the inductance L of the inductor 22. When the input switch 23 is closed, the catch diode 25 is not conducting and the voltage on the input of the inductor 22 is the input voltage Vi less any forward voltage drop in the switch 23. In a modern buck converter, the switch 23 will be a MOSFET having a very low voltage drop, so the voltage on the input side of the inductor 22 will be essentially the input voltage Vi. The current Ic in the inductor 22 will rise at a rate di/dt that is equal to the difference between the input voltage Vi and the output voltage Vo divided by the inductance L of the inductor 22.

The di/dt is inherently limited by the inductance L of the inductor 22, but making the inductance very small is an option with limitations. Multi-phasing and operation at very high frequency helps, but the limitation persists.

Figure 4:
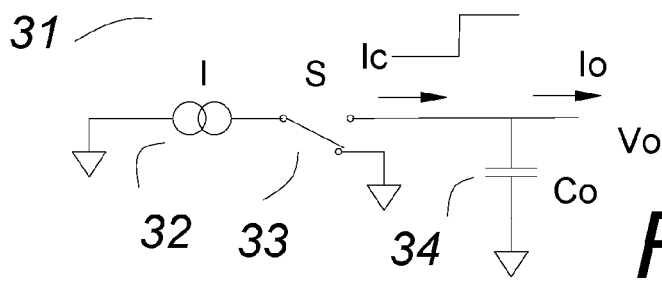
FIG. 4 shows that the current in a switched current power converter can change as fast as a switch can close or open.

FIG. 4 shows the simplest embodiment of the present invention. A switched-current power converter 31 comprises a constant current source 32 which feeds into a switch 33. The switch 33 conducts the current I from the current source 32 either to an output capacitor 34 and the load (not shown) or to a return. The current Ic can go from zero to full load as fast as the switch 33 can change state. In a practical switched-current converter, the switch 33 may be a pair of MOSFETs, for fast operation and low conduction losses. While very important to the success of a practical design, the nature of the switches is not at the heart of the invention, and any switching means, now known or yet to be invented may be used so long as it can accomplish the function of directing the current Ic either to the output or to the return.

Figure 5:
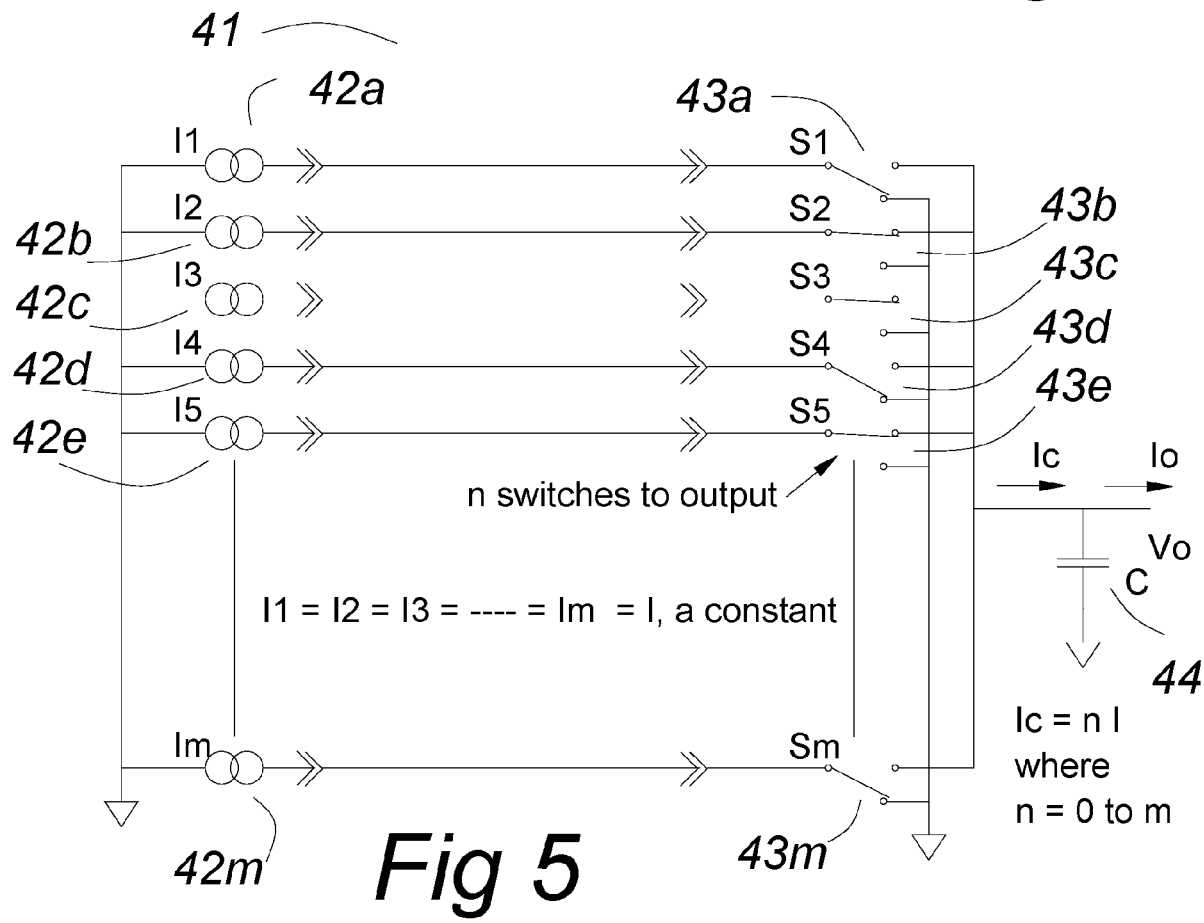
FIG. 5 shows a generalized switched-current power converter having m parallel current sources.

FIG. 5 shows a switched-current power converter 41 comprising a quantity m constant current sources 42a–42m, where m is an positive integer. Each of the constant current sources 42a–42m may have an equal constant current I, as an example, not a limitation. As the constant current will depend upon component values that are not precise, "equal" as used in this specification and the claims is not an absolute and allows some variation between the currents.

For purpose of reference for the specification and the claims, each of the constant current sources has a current input, which is the side connected to the return, and a current output, which is connected to a switching means.

A number m switching means 43a–43m can individually switch the individual constant current sources 42a–42m either to return or to an output capacitor 44 and a load (not shown). If n is the number of the switching means 42a–42m which are closed to the output capacitor 44, the current Ic equals n time I, where n is a positive integer less than or equal to m. For purposes of reference for the specification and the claims, the switching means is in a first switch state if the current is switched to return, and it is in a second switch state if it is switched to the output capacitor 44.

It is noteworthy that the switched-current power converter comprises no inductor components. To the extent that there is inductance in the power distribution bus, the current through them is constant, so there is no change in stored energy in the inductance. As the several switching means 43a–43m change state, the voltage on the lines of the power distribution bus will change from essentially zero to essentially the output voltage Vo. This may be a low voltage, so the change in energy due to the change in voltage and the capacitance of the power distribution bus is very low, lower than in many data buses.

In FIG. 5, it is contemplated that the constant current sources 42a–42m may be in one location, and the switching means 43a–43m may be at another location, close to the output capacitor 44 and the load (not shown). A simple ribbon cable may carry the several constant currents. This arrangements keeps the components near the load very simple and little power is dissipated near the load. Alternatively, it is surely possible to locate all of the components in one package, to comprise a self contained power converter.

The constant current sources may, as an illustration, not a limitation, be buck converter circuits configured for constant current outputs. A representative buck converter circuit is shown in FIG. 3, and the design and application of buck converters would be well known to one skilled in the art of power converters. A buck converter circuit may be configured for constant current output in a number of way. As an example, not a limitation, the buck converter circuit could employ a hysteretic control whereby when the output current of the buck converter circuit reaches an upper current threshold, the switch 23 is opened, and when the output current of the buck converter circuit reaches a lower threshold, the switch 23 is closed. Alternatively, also as an illustration, not a limitation, the buck converter circuit could be controlled by the familiar current mode controller, and the current reference for the current mode controller can be a fixed current reference to maintain the current output at a constant.

Figure 6:
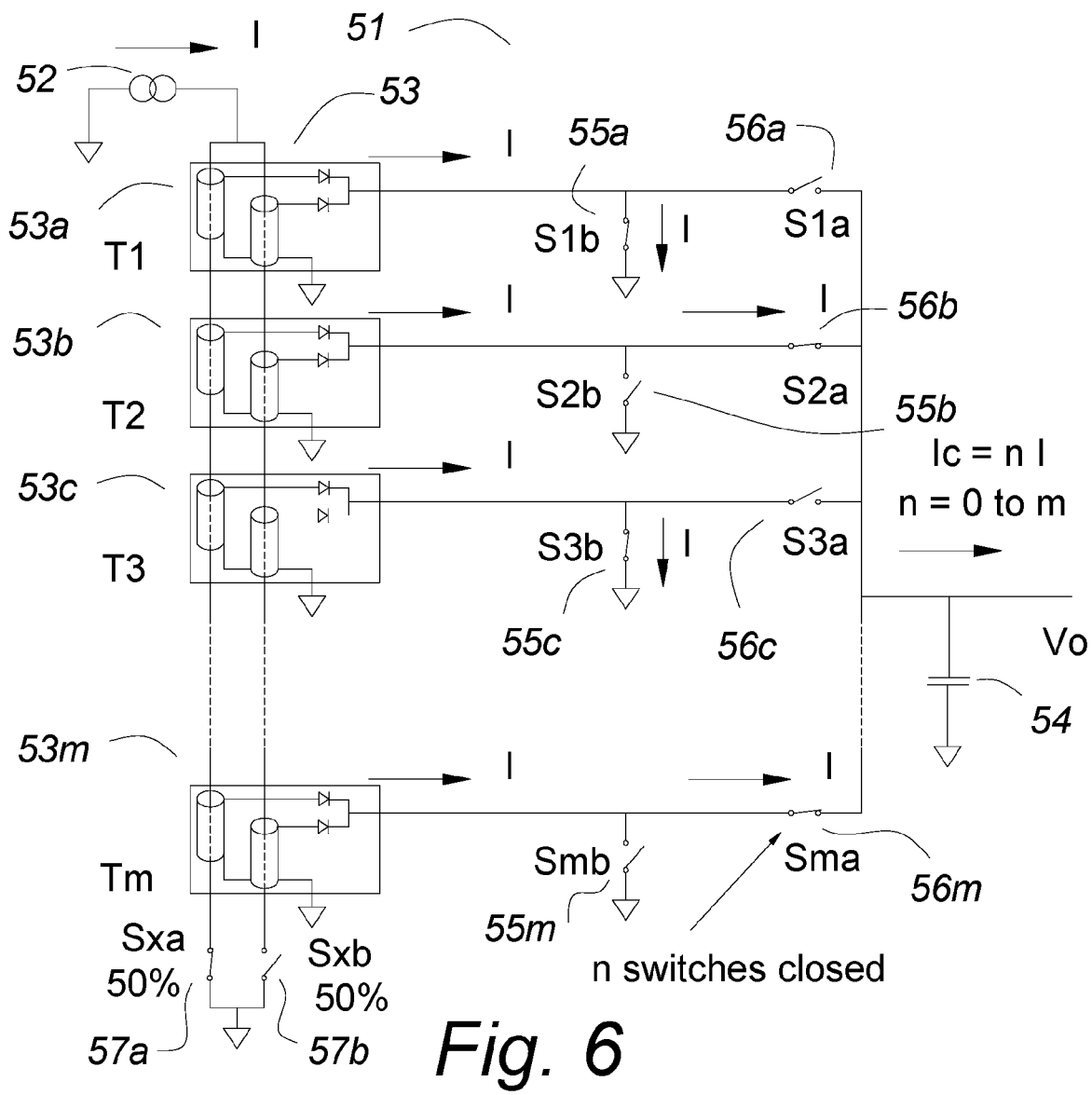
FIG. 6 shows a switched-current power converter in which a matrix transformer driven by a constant current power source comprises the parallel current sources.

FIG. 6 shows a switched-current power converter 51 in which the constant current sources are from a matrix transformer 53 comprising a number m of elements 53a–53m. A matrix transformer element is defined as a section of the matrix transformer comprising a magnetic core and a secondary winding. For the purpose of this specification and the claims, the definition of an "element" of a matrix transformer is expanded to include the portion of the primary winding passing through the element, the secondary rectifiers and the internal and external connections necessary to function as a constant current source so that the numerous parts and components of the element may be lumped together into a functional entity and can be easily recited as an element without reciting all of the internal components thereof.

The power source for the excitation of the matrix transformer 53 may be a constant current source 52. The matrix transformer 53 may have a push pull primary winding excited at 100 percent duty cycle by push-pull switches 57a and 57b. Because the net ampere turns in a transformer must equal zero (neglecting magnetization currents), and because each of the elements 53a–53m of the matrix transformer 53 is itself a transformer, and because all of the elements 53a–53m are in series and thus have equal primary currents, all of the secondary currents must be equal. This is a characteristic of matrix transformers. However, because of flux capacity limitations, a transformer cannot operate with dc, so the primary must be an alternating excitation (such as the push-pull excitation shown as an illustration, not a limitation) and the secondary must be rectified to restore the dc.

The secondary current I from the matrix transformer elements 53a–53m may be switched to return by first switches 55a–55m or to an output capacitor 54 and a load (not shown) by second switches 56a–56m. In a practical switched-current power converter, the first and second switches 55a–55m and 56a–56m will likely be MOSFET switches, for fast operation and low forward drop.

While it is contemplated that using a matrix transformer is a preferred method of making equal parallel current sources, any other circuit or device that produces a constant current output may be used for this invention. Indeed, if the input voltage is not significantly higher than the output voltage, it may be difficult to implement a matrix transformer embodiment. A number of parallel buck converters operating in constant current mode would suffice as well, and they can be multi-phased. Each section would be controlled as a constant current source. While in many of the examples of switched-current power converter use a plurality of equal currents, that also is not necessary. A binary relationship is another possibility. Also, "constant current" does not necessarily mean a fixed, never varying magnitude of current. The constant current may be changed for different modes of operation, as an example, not a limitation.

Figure 7:
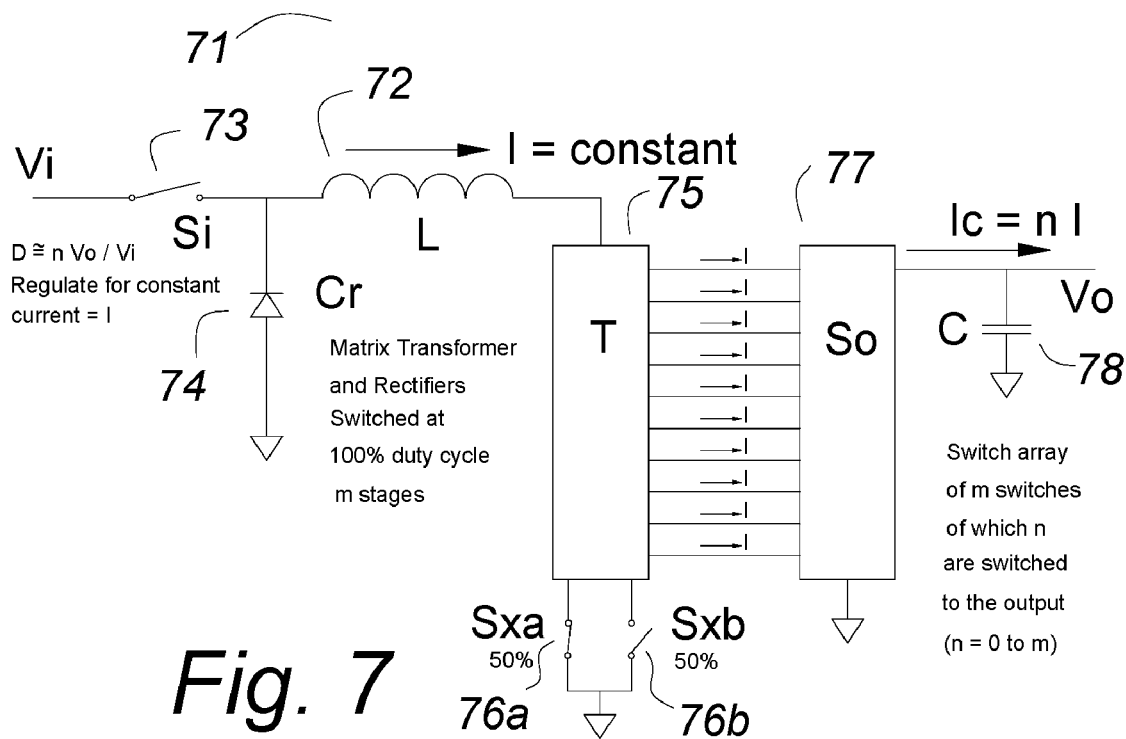
FIG. 7 shows that the constant current power source can be a buck converter operated in constant current mode.

FIG. 7 shows a switched-current power converter 71 comprising a matrix transformer 75 with its primary excited at 100 percent duty cycle by push-pull switches 76a and 76b. A switch array 77 switches the several outputs of the matrix transformer 75 either to return or to an output capacitor 78 and a load (not shown). The power source for the excitation of the matrix transformer 75 comprises a buck converter circuit as a constant current source comprising an inductor 72, an input switch 73 and a catch diode 74. The input switch 73, the catch diode 74 and the inductor 72 will be recognized as a buck converter circuit, except that there is no capacitor on the output side of the inductor 72, it is connected directly to the matrix transformer 75. The input switch 73 is pulse width modulated so as to maintain a constant current in the inductor 72. In actuality, the current I from the inductor 72 will have a small triangle component, as is well known to one skilled in the art of power converters. There are a number of control options for the switch 73. A simple control is simply a hysteretic control means, controlling on the magnitude of the current I, turning on the input switch 73 when the current I drops below a lower threshold, and turning it off when the current I rises above an upper threshold. Another choice would be current mode control means that could be a commercial current mode control integrated circuit set up for a constant current mode by having a fixed current reference. In a practical switched-current converter, the input switch may be a MOSFET switch, and the catch diode may be a synchronous rectifier comprising a MOSFET, for fast switching and low voltage drop.

Figure 8:
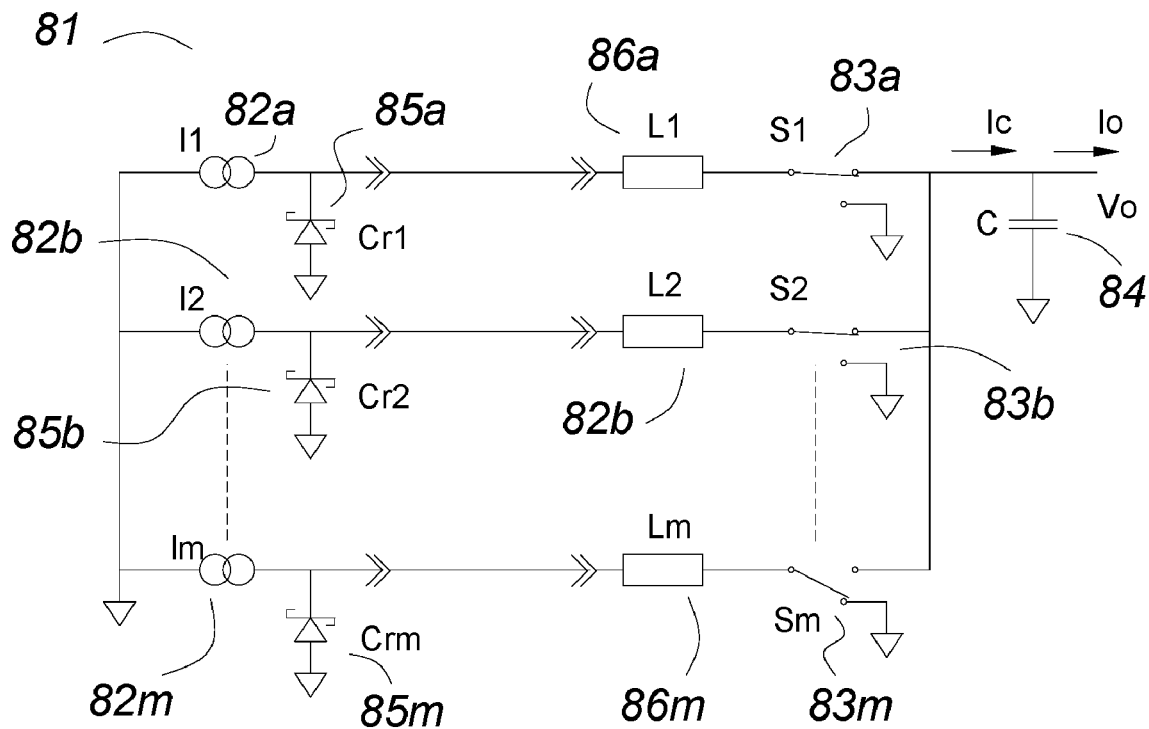
FIG. 8 shows that it may be desirable to use small bead inductors in the constant current lines.

FIG. 8 shows a switched-current power converter 81 comprising a plurality of constant current sources 82a–82m and a plurality of switches 83a–83m which may switch the currents from the constant current sources 82a–82m either to return or to an output capacitor 84 and a load (not shown). While the constant currant sources 82a–82m will often have equal constant currents, that is not necessary. As an illustration, not a limitation, the currents I1, I2, - - - , Im could have a binary relationship and the current Ic may be determined by which of the binary currents is switched to the output capacitor 84 and the load.

FIG. 8 also shows a plurality of bead inductors 86a–86m on the several constant current lines. These may attenuate noise from the switches 83a–83m and from the load (not shown). They may also assist in keeping the currents constant at the input side of the switches 83a–83m. If the constant current sources 82a–82m have glitches, the bead inductors 86a–86m can sustain the current essentially constant through the glitches. Such glitches may occur if the constant current sources are matrix transformer elements and if there are instants of "dead time" between half cycles of the excitation of the matrix transformer. It may also be helpful to use a plurality of catch diodes 85a–85m, but if they are used, they should preferably be very small, to avoid extra capacitance on the line.

Figure 9:
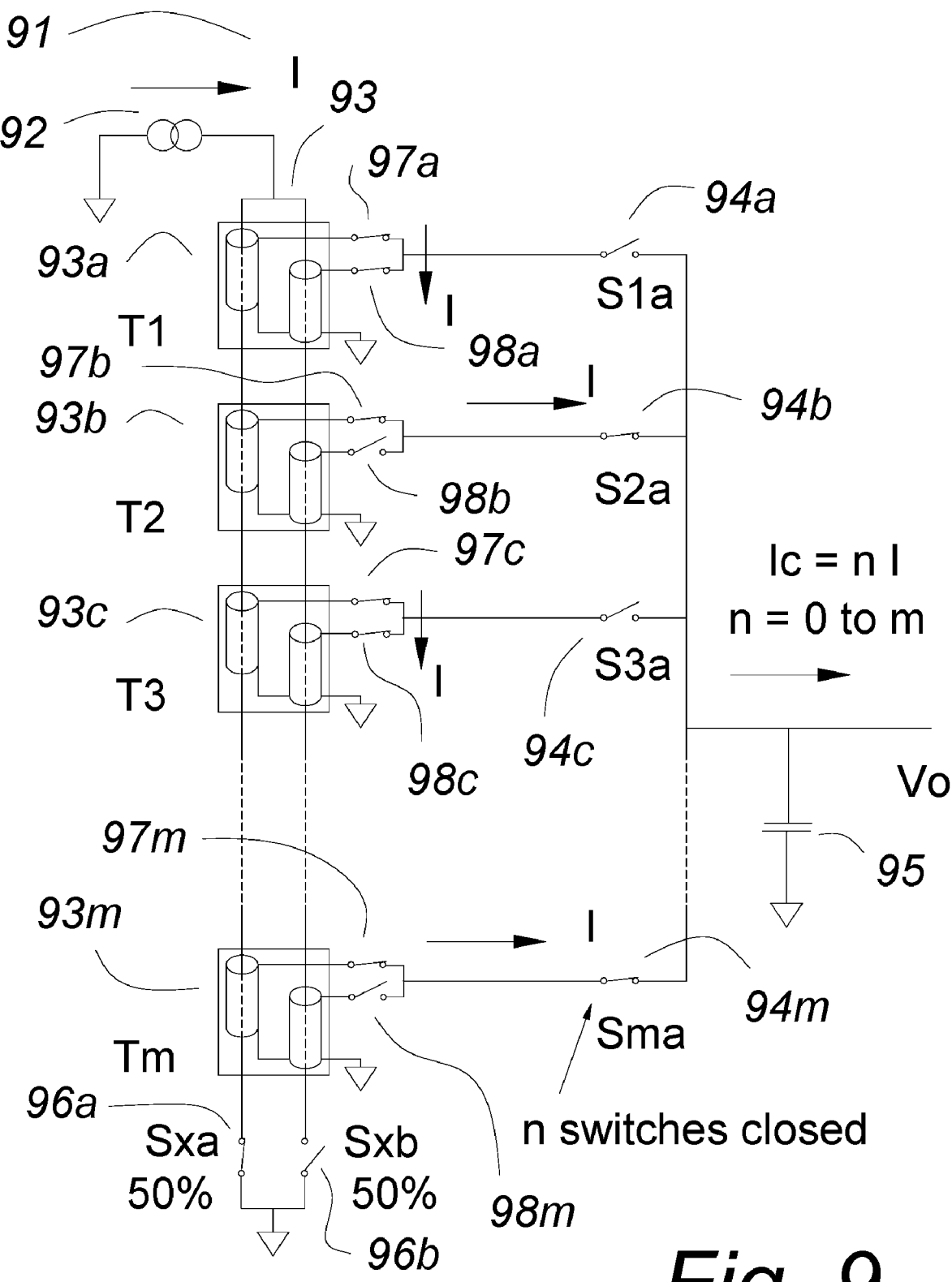
FIG. 9 shows an alternative switching arrangement for a switched-current power converter in which a matrix transformer comprises the parallel current sources.

FIG. 9 shows a switched-current power converter 91 comprising a constant current power source 92 and a matrix transformer 93 comprising elements 93a–93m. Switches 96a and 96b provide a 100 percent duty cycle push pull excitation. The switched-current power converter 91 has an alternative switching arrangement which is practical where the matrix transformer 93 is located with the other circuits proximate to an output capacitor 95 and a load (not shown). A plurality of switches 94a–94m may be closed to direct a constant current to the output capacitor 95 and the load, or they may be open. When current is flowing to the output capacitor 95 and the load, the plurality of switches 97a–97m and 98a–98m are operated as synchronous rectifiers for the matrix transformer 93 as would be well known to one skilled in the art. However, the usual switch to return seen in the other examples of switched-current power converters in not needed if logic is used to turn on both switches 97a–97m and 98a–98m for those elements 93a–93m for which the current is not switched to the load. The current can circulate through the synchronous rectifiers within the transformer, as shown for elements 93a and 93c. This saves a switch for each line.

For this specification and the claims, this alternative embodiment of the invention is generalized by defining a constant current source having an internal switching means in which the internal switching means has a first internal switch state in which the current output of the constant current source is internally short circuited so that the current output to the switching means is zero. The internal switching means has a second internal switch state in which the current output of the constant current source is not shorted.

In the example of FIG. 9, the internal switching means is in its first internal switching state if both of the synchronous rectifiers 97a–97m and 98a–98m in any of the element 93a–93m are both turned on at the same time, and the internal switching means is in its second internal switch state if the synchronous rectifiers 97a–97m and 98a–98m are closed alternately, never a the same time, performing their ordinary synchronous rectifying function.

Figure 10:
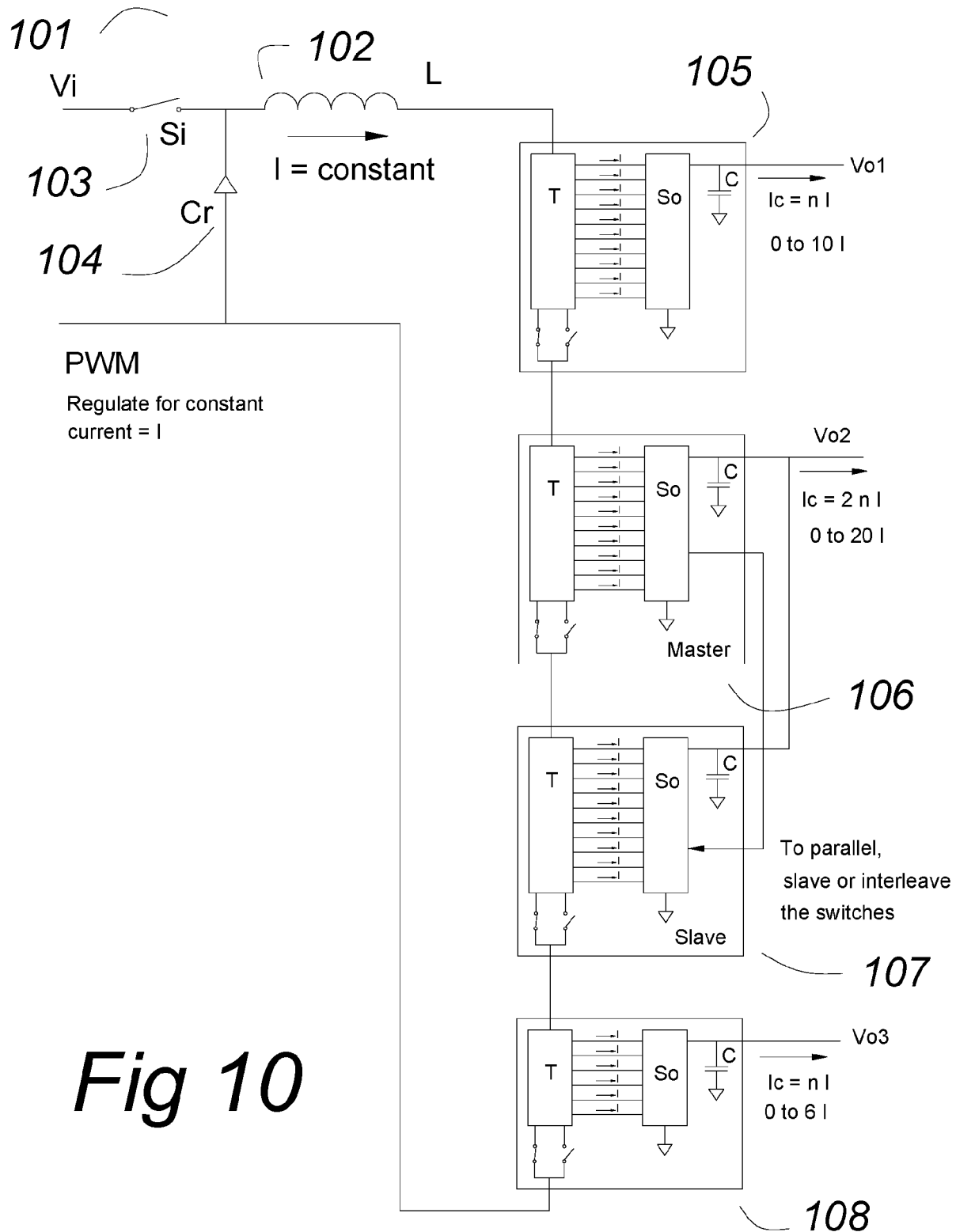
FIG. 10 shows that a multiple output power supply can be build by putting several switched-current power converters in series with a single constant current power source.

FIG. 10 shows a multiple output switched current power converter 101. A buck converter comprising an inductor 102, an input switch 103 and a catch diode 104 provides a constant current I which is then taken to four switched-current power converters 105 through 107, connected so that their constant current inputs are wired in series. FIG. 10 also shows that switched-current power converters can be paralleled easily, as shown for switched-current power converter modules 106 and 107. The loads may be balanced by slaving the switches, or by interleaving them so that an equal number of switches, plus or minus 1, are closed to the load in each of the paralleled modules. The input voltage Vi must be greater than the average total voltage reflected to inputs of the series modules, the maximum occurring when all of the series modules are at maximum load.

Figure 11:
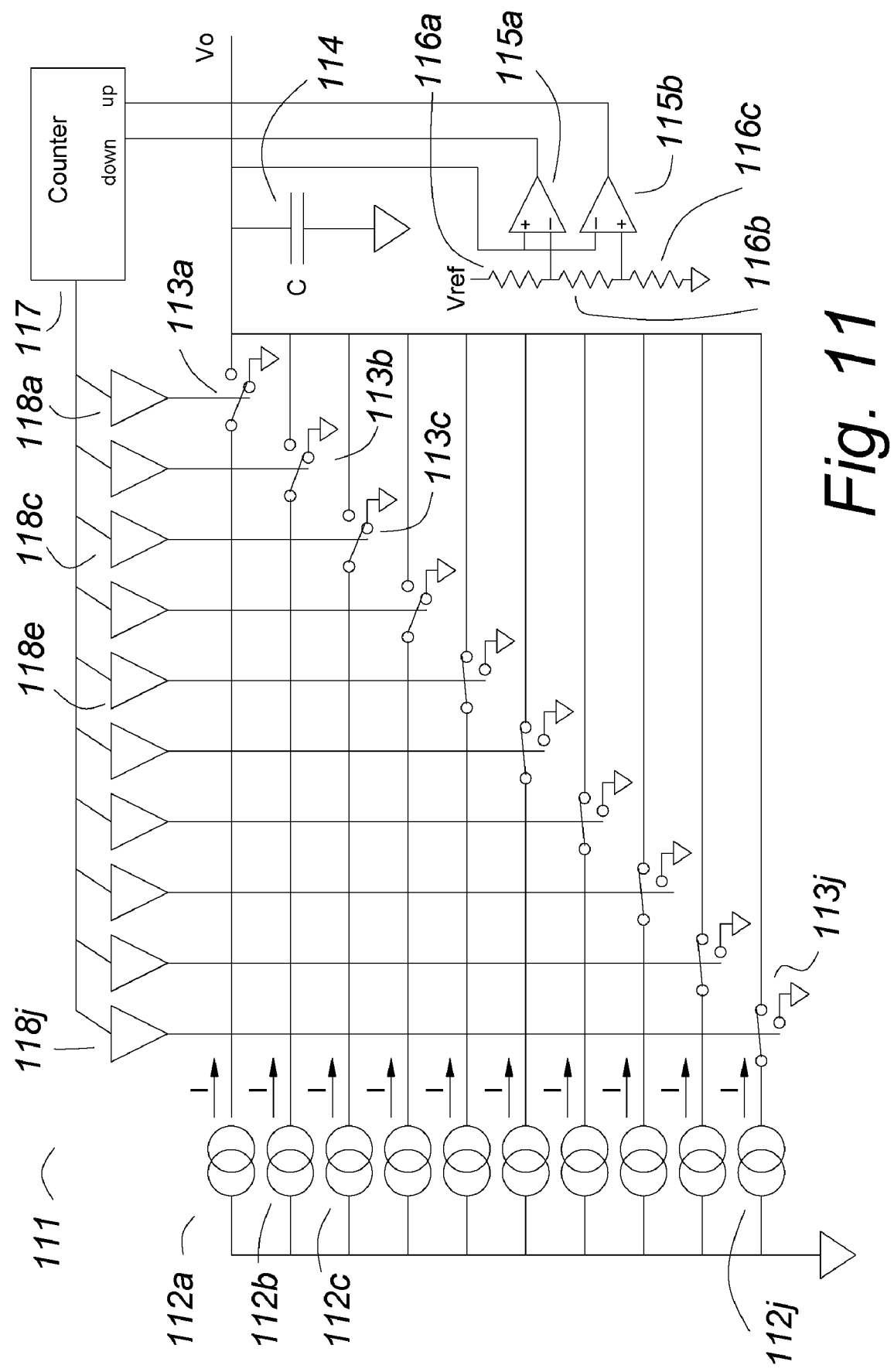
FIG. 11 shows a switched-current power converter in which the number of switches closed to the load is controlled by an up-down counter that is responsive to positive or negative error voltages.

FIG. 11 shows a switched-current power converter 111 having a simple voltage control for the output voltage Vo. A plurality of constant current sources 112a–112j may be connected to an output capacitor 114 and a load (not shown) or to return by a plurality of switches 113a–113j. The plurality of switches 113a–113j are controlled by a plurality of switch driver means 118a–118j which are controlled in turn by an up-down counter means 117. In operation, the output voltage Vo is compared to a reference voltage Vref through a resistor divider network 116a–116c by two comparator means 115a and 115b. If the output voltage Vo is above an upper threshold, a count of the up-down counter means 117 will count down, and if it is below the lower threshold, the counter means 118 will count up. The slew rate of the switched-current power converter 121 is limited by the clock rate of the counter 117, but it can still be very fast as compared to prior art power converters.

Figure 12:
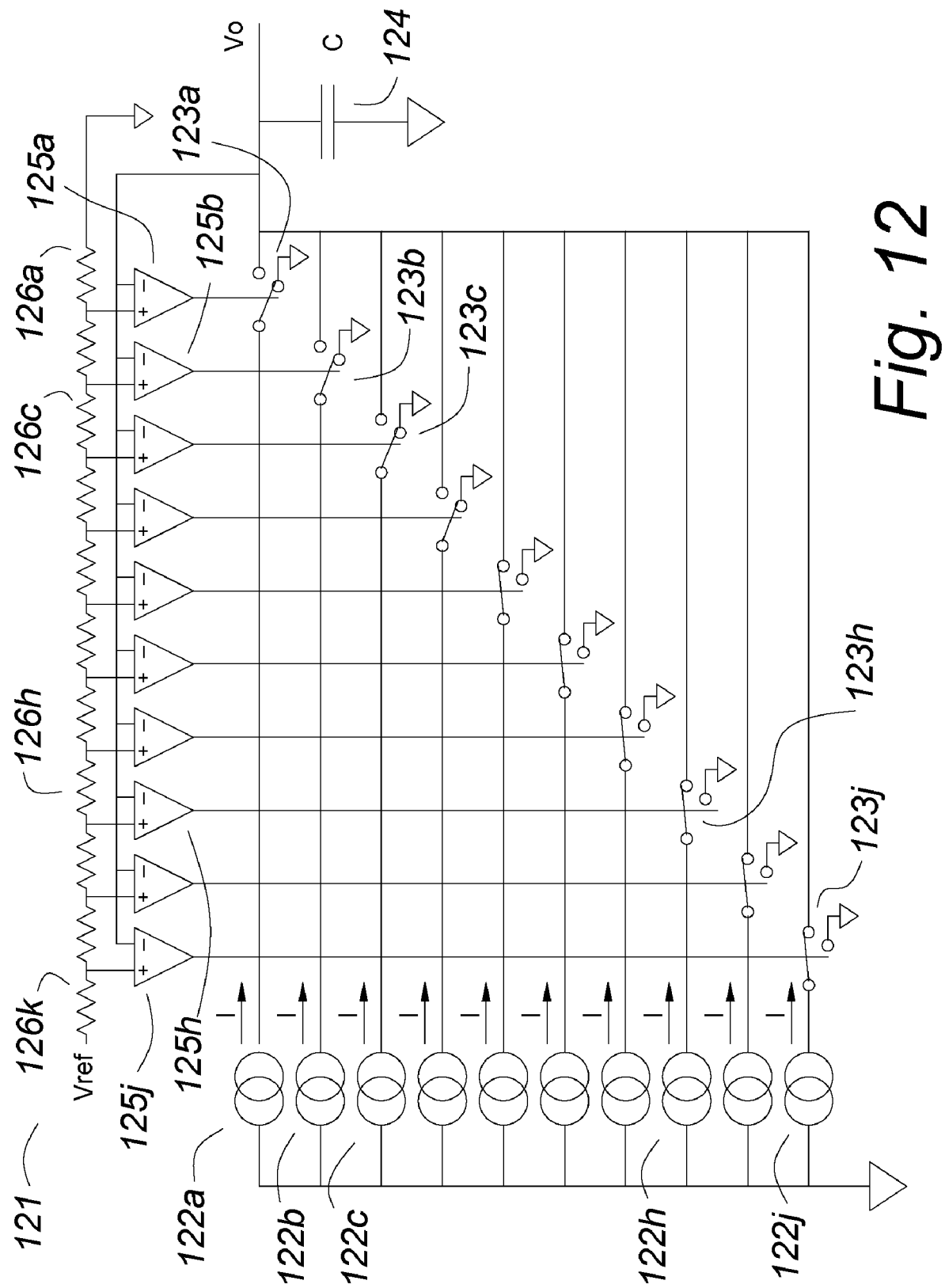
FIG. 12 shows a switched-current power converter in which the number of switches closed to the load is controlled by a plurality of comparators with incremental references voltages derived from a resistor divider from a reference voltage.

FIG. 12 introduces another method of voltage control. A switched-current power converter 121 comprises a plurality of constant current sources 122a–122j which may be switched to an output capacitor 124 and a load (not shown) by a plurality of switches 123a–123j. The switches 123a–123j are controlled by a plurality of comparator means 125a–125j such that the respective switches are closed if the respective comparator means is below its reference voltage and is open if it is above its reference voltage. The comparator reference voltages for the comparator means s 125a–125j are established by a resistor divider network comprising resistors 126a–126k. It is contemplated that the end resistors 126a and 126k may be relatively large (in resistance value), while the intermediate resistors will be relatively small, so that the incremental voltage from one comparator to the next is small.

To describe the operation of the circuit, consider the case of initial turn on. First, with all of the switches 123a–123j held switched to the return, the constant current sources 122a–122j may be energized and brought up to steady state. Then the switches 123a–123j may be released, to be controlled by the comparators 125a–125j. Since the voltage is initially below the lowest threshold, all of the switches 123a–123j will be switched to the load, and the output capacitor 124 will charge at the maximum rate, with full current. As the voltage on the output capacitor 124 rises, the successive thresholds will be reached, first switch 123 a will switch to the return, then switch 123b, then switch 123c, and so forth. At some point, if a load is present, the current out of the switched-current power converter 121 will be in approximate equilibrium with the sum of the currents through the switches 123a–123j that are switched to the output capacitor 124 and the load. At this point, no additional charge will be added to the output capacitor 124, the voltage will rise no further and no additional switches 123a–123j will switch. If there is no load, then the voltage will rise until all of the switches 123a–123j are switched to return. If the load current increases, more switches will switch to the load until a new equilibrium is reached. In practice, an exact equilibrium is unlikely, so the last switch will likely modulate to provide an intermediate average current value. It is preferred that the comparators 125a–125j have some hysteresis, so that the circuit does not oscillate at too fast a rate around the threshold.

Figure 13:
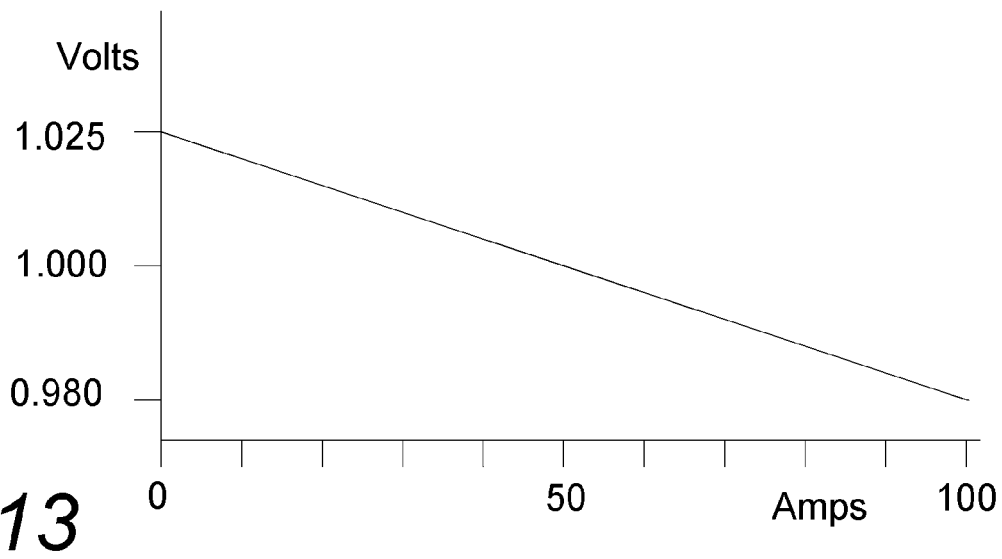
FIG. 13 shows a representative voltage vs load graph for the switched-current power converter of FIG. 12.

FIG. 13 shows a representative voltage vs current graph for the switched power converter 121 of FIG. 12. This is quite similar to the characteristics specified for some microprocessors.

Figure 14:
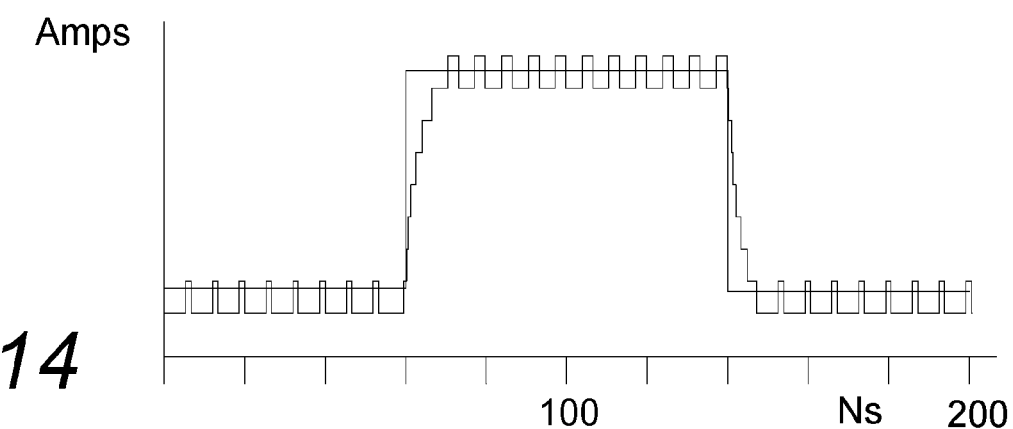
FIG. 14 shows a spice simulation output of the dynamic response of the switched-current power converter of figure 12 to a step change in load current.

FIG. 14 shows a representative response to a step change in load for the switched-current power converter of FIG. 121.

Figure 15:
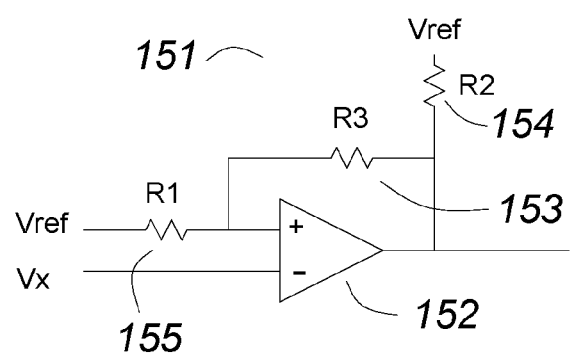
FIG. 15 shows a familiar comparator employing hysteresis feedback.

FIG. 15 shows a well known circuit for incorporating hysteresis. A comparator circuit 151 comprises a comparator 152, a hysteresis feedback resistor 153, a pull up resistor 154 and an input resistor 155. When a voltage Vx rises above the threshold voltage Vref, the output of the comparator goes low. Previously the voltage divider network comprising the resistors R1, R2 and R3 had Vref on both ends, so the voltage at the positive input of the comparator 152 was also Vref (assuming an open output on the comparator and no other sources of leakage current).

Once the threshold is reached, and the comparator switches, the resistors R1 and R3 comprise a voltage divider between Vref and zero (assuming a comparator output which is a pull down to ground). The positive input of the comparator has thus been lowered, and the voltage Vx would have to fall further to reset the comparator.

For the purpose of this specification and the claims, a hysteresis feedback resistor is a resistor from the output of a comparator means to its positively referenced input terminal. A comparator means is said to "have hysteresis" if its positive-going threshold voltage is higher than its negative-going threshold voltage. This may be achieved through the use of a hysteresis feedback resistor. However, some commercially available comparator means have internally generated hysteresis, and the use of such a comparator means is equivalent for the purposes of teaching this invention.

Figure 16:
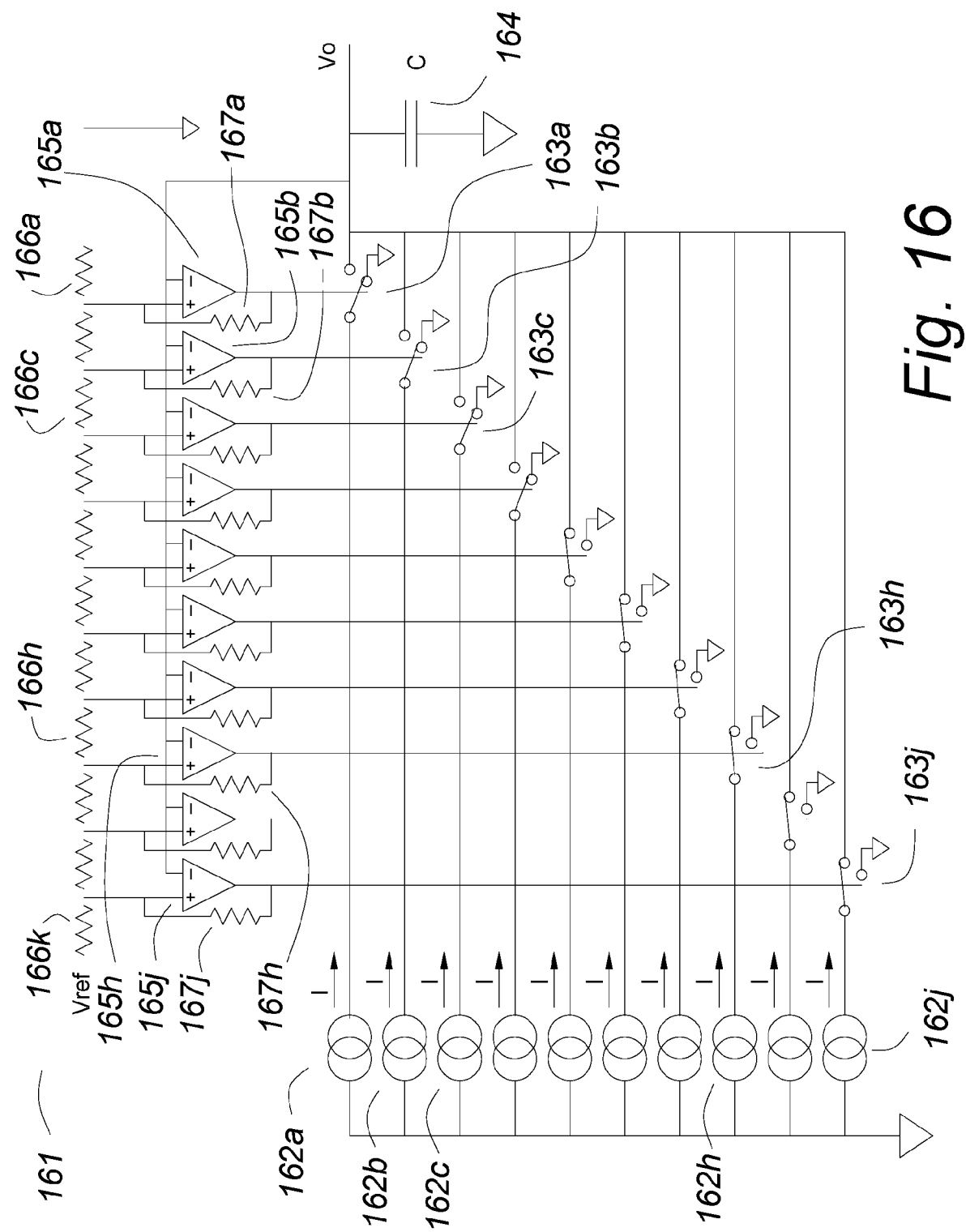
FIG. 16 shows the switched current power converter of FIG. 12 further comprising a plurality of hysteresis feedback resistors.

FIG. 16 shows a switched-current power converter 161 that is quite similar to the switched-current power converter 121 of FIG. 12, except that hysteresis resistors 167a–167j have been added. The switched-current power converter 161 comprises a plurality of constant current sources 162a–162j which may be switched to an output capacitor 164 and a load (not shown) by a plurality of switches 163a–163j. The switches 163a–163j are controlled by a plurality of comparators 165a–165j such that the respective switches are closed if the respective comparator is below its reference voltage and is open if it is above its reference voltage. The reference voltages for the comparators 165a–165j are established by a resistor divider network comprising resistors 166a–166k. It is contemplated that the end resistors 166a and 166k may be relatively large (in resistance value), while the intermediate resistors will be relatively small, so that the incremental voltage from one comparator to the next is small.

To describe the operation of the circuit, consider the case of initial turn on. First, with all of the switches 163a–163j held switched to the return, the constant current sources 162a–162j may be energized and brought up to steady state. Then the switches 163a–163j may be released, to be controlled by the comparators 165a–165j. Since the voltage is initially below the lowest threshold, all of the switches 163a–163j will be switched to the load, and the output capacitor 164 will charge at the maximum rate, with full current. As the voltage on the output capacitor 164 rises, the successive thresholds will be reached, first switch 163a will switch to the return, then switch 163b, then switch 163c, and so forth. At some point, if a load is present, the current out of the switched-current power converter 161 will be in approximate equilibrium with the sum of the currents through the switches 163a–163j that are switched to the output capacitor 164 and the load. At this point, no additional charge will be added to the output capacitor 164, the voltage will rise no further and no additional switches 163a–163j will switch. If there is no load, then the voltage will rise until all of the switches 163a–163j are switched to return. If the load current increases, more switches will switch to the load until a new equilibrium is reached. In practice, an exact equilibrium is unlikely, so the last switch will likely modulate to provide an intermediate average current value.

By incorporating the hysteresis feedback resistors 167a–167j, a controlled hysteresis band is established. If the output voltage falls and an additional switch is closed to the output, and the additional current is more than sufficient to equal the load current, then the output voltage will begin to rise. The output voltage will have to rise above the original threshold by the amount of hysteresis voltage provided, to prevent rapid oscillation about the threshold. It is suggested that the hysteresis voltage be equal to approximately one half of the incremental step voltage established by the resistor divider network comprising the resistors 166a–166k, so that the step in voltage in either direction to cause the next switch change (up or down) is comparable.

Note, however, that the hysteresis resistors 167a–167j pull the entire resistor divider comprising the resistors 166a–166k. This has the effect of reducing the effective step voltage by approximately the amount of the hysteresis voltage. It is a fairly complex but entirely straightforward calculation to determine the values for the resistors and the effect each has on the network, but it is suggested to model the circuit with a spice simulator and verify the results by simulation. Note further that if the hysteresis voltage approaches the step voltage, the result is to flatten out the voltage characteristics as shown in FIG. 13. If the hysteresis voltage equals or exceeds the step voltage, the circuit becomes unstable, and will bang between zero output current and full output current.

Figure 17:
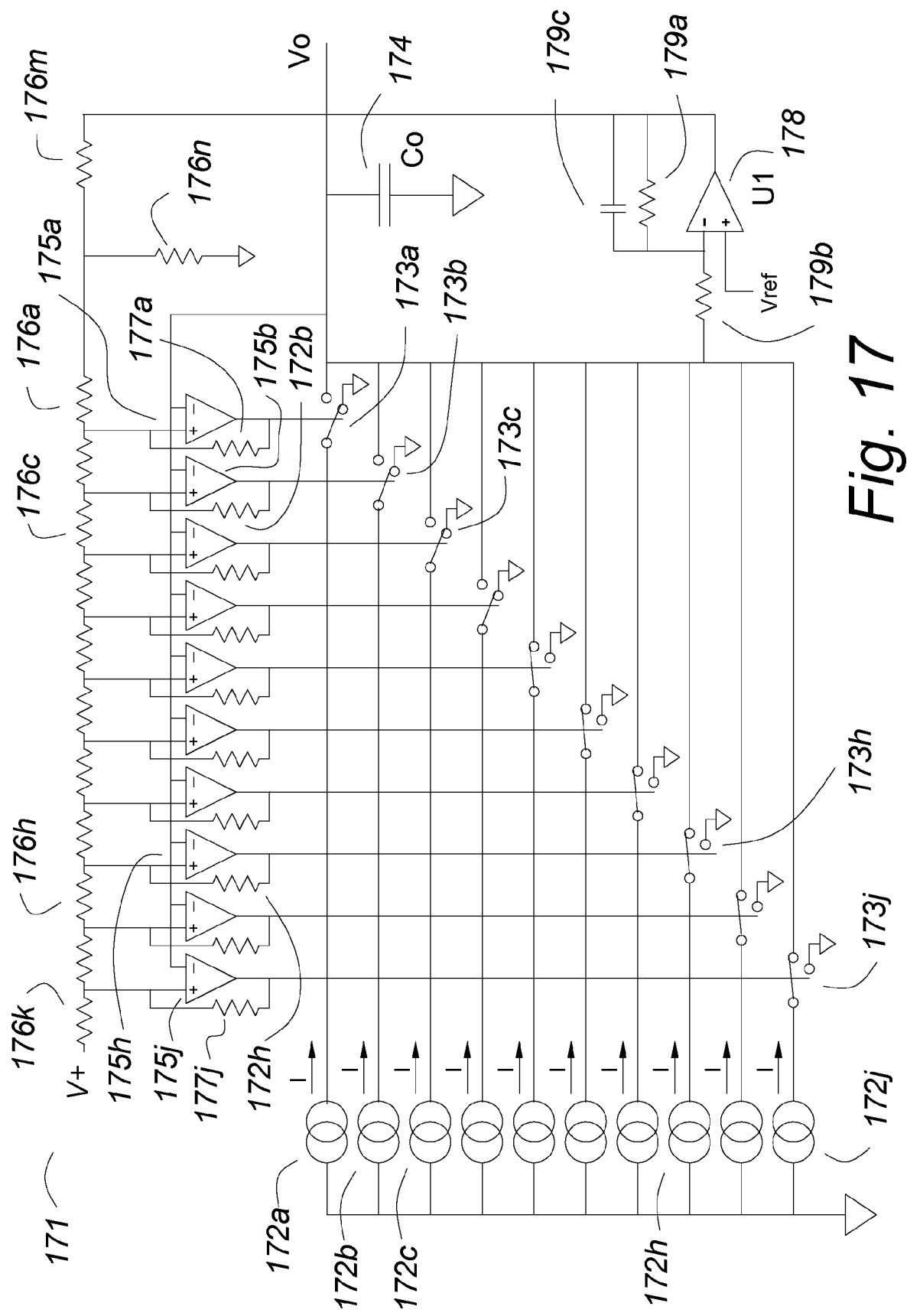
FIG. 17 shows the switched current power converter of FIG. 19 further comprising a voltage stabilization network.

FIG. 17 shows a switched-current power converter 171 that is similar to the switched-current power converter 161 with the addition of a voltage stabilization circuit. A switched-current power converter 171 comprises a plurality of constant current sources 172a–172j which may be switched to an output capacitor 174 and a load (not shown) by a plurality of switches 173a–173j. The switches 173a–173j are controlled by a plurality of comparators 175a–175j such that the respective switches are closed if the respective comparator is below its reference voltage and is open if it is above its reference voltage. The reference voltages for the comparators 175a–175j are established by a resistor divider network comprising resistors 176a–176k. It is contemplated that the end resistors 176a and 176k may be relatively large (in resistance value), while the intermediate resistors will be relatively small, so that the incremental voltage from one comparator to the next is small.

To describe the operation of the circuit, consider the case of initial turn on. First, with all of the switches 173a–173j held switched to the return, the constant current sources 172a–172j may be energized and brought up to steady state. Then the switches 173a–173j may be released, to be controlled by the comparators 175a–175j. Since the voltage is initially below the lowest threshold, all of the switches 173a–173j will be switched to the load, and the output capacitor 174 will charge at the maximum rate, with full current. As the voltage on the output capacitor 174 rises, the successive thresholds will be reached, first switch 173 a will switch to the return, then switch 173b, then switch 173c, and so forth. At some point, if a load is present, the current out of the switched-current power converter 171 will be in approximate equilibrium with the sum of the currents through the switches 173a–173j that are switched to the output capacitor 174 and the load. At this point, no additional charge will be added to the output capacitor 174, the voltage will rise no further and no additional switches 173a–173j will switch. If there is no load, then the voltage will rise until all of the switches 173a–173j are switched to return. If the load current increases, more switches will switch to the load until a new equilibrium is reached. In practice, an exact equilibrium is unlikely, so the last switch will likely modulate to provide an intermediate average current value.

In the switched-current power converter 161 of FIG. 16, the resistor 166a was taken to ground (zero volts) to establish the voltages for the resistor divider network. By contrast, in the switched-current power converter 171 of FIG. 17, the comparable resistor 176a is taken to a voltage stabilization circuit comprising, as an example, not a limitation, an operational amplifier 178, an input resistor 179b, a feed back resistor 179a and attenuation resistors 176m and 176n. The attenuation network comprising the resistors 176m and 176n may be designed so that the operational amplifier has a limited ability to change the voltage on the resistor divider network comprising the resistors 176a–176k.

Initially, upon power turn on, the output voltage will be low, so the operational amplifier 178 will be saturated in the high state. As the voltage on the output capacitor 174 rises, the first comparator to change state should be the comparator 177a, so the values of the resistors in the voltage divider and attenuation networks should be chosen so that the reference for the comparator 177a is just above the desired final value of the output voltage Vo. Once the output voltage equals the reference Voltage Vref, the operational amplifier 178 will become linear, and it will begin to reduce the voltage of the resistor divider, thus taking control of the set point voltage for the "active" comparator, that is the one that has just switched, or the one that is just about to switch, depending upon the drift of the output voltage. If one comparator is modulating to provide an average intermediate output current, that will be the one whose reference is thus controlled.

A feedback capacitor 179c may be used for frequency compensation, as an illustration, not a limitation. Frequency compensation and stabilization is a complex but well established art. The exact frequency compensation needed for a particular circuit is not a point of novelty of the invention, so for the purpose of this disclosure it suffices to note that frequency compensation may be needed. The frequency compensation is likely to introduce a slight lag, so it can be expected that the voltage will overshoot slightly, but it should recover very quickly, much more quickly that in a prior art power converter.

Figure 18:
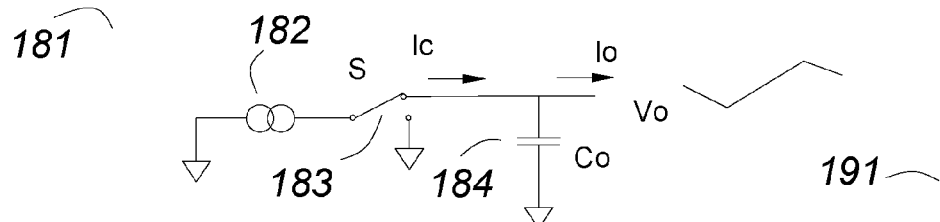
FIG. 18 shows that the voltage cannot change rapidly in a prior art buck converter, as the voltage depends upon a current ramping up in an inductor and charge ramping up in a capacitor, neither of which can occur rapidly.

FIG. 18 shows that the dynamic response to change the output voltage of a switched-current power converter is limited. A simple switched-current power converter 181 comprises a current source 182 and a switch 183 that can direct the current from the current source 183 to return or to an output capacitor 184. The rate of change of the output voltage is limited to a dv/dt equal to the current divided by the capacitance.

However, it may be desirable in a power converter to change the output voltage rapidly. As an example, not a limitation, a microprocessor may have modes of operation that require different input voltages, and it may be desirable to switch between those modes of operation very rapidly. To cause a step change in voltage on a capacitor, the charge on the capacitor must be changed very quickly. Using current alone, a very large current would have to be applied (or removed) to change the voltage quickly, and its timing would be very critical.

Figure 19:
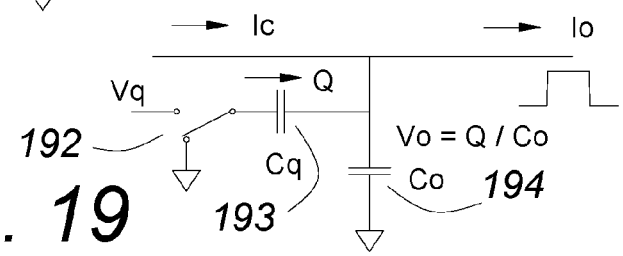
FIG. 19 shows that the voltage can change very rapidly in a switched-charge power converter.

The switched-charge circuit 191 of FIG. 19 can accomplish a very fast and accurate step change in the output voltage Vo. A charge transfer capacitor 193 can dump or remove charge form the output capacitor 194 by changing the state of a switch 192. If the switch 192 is switched from return to a charging voltage Vq, then the charge transfer capacitor 193 will charge very rapidly, and transfer a fixed charge to the output capacitor 194, causing the output voltage Vo to step up. Conversely, if the switch 192 is switched from the charging voltage Vq to return, the charge transfer capacitor 193 will discharge rapidly, transferring a fixed charge out of the output capacitor 194, causing the output voltage Vo to step down. Energy is lost in this process, and the pulse currents will be very large. The charging voltage Vq must be from a low impedance voltage source, one that likely includes a large output capacitor, preferably much larger than the charge transfer capacitor 193. There is necessarily resistance in the circuit, in particular, the on resistance of the switch 192, which is preferably a pair of MOSFETs. The resistance does not affect the magnitude of the transferred charge and the size of the voltage step that results, but the resistance will affect the rate at which the charge is transferred.

The switched-charge has no ability to regulate voltage, only cause a step change in voltage. Once the step change has been accomplished, regulation from that time is by control of the current to the output capacitor 194.

Figure 20:
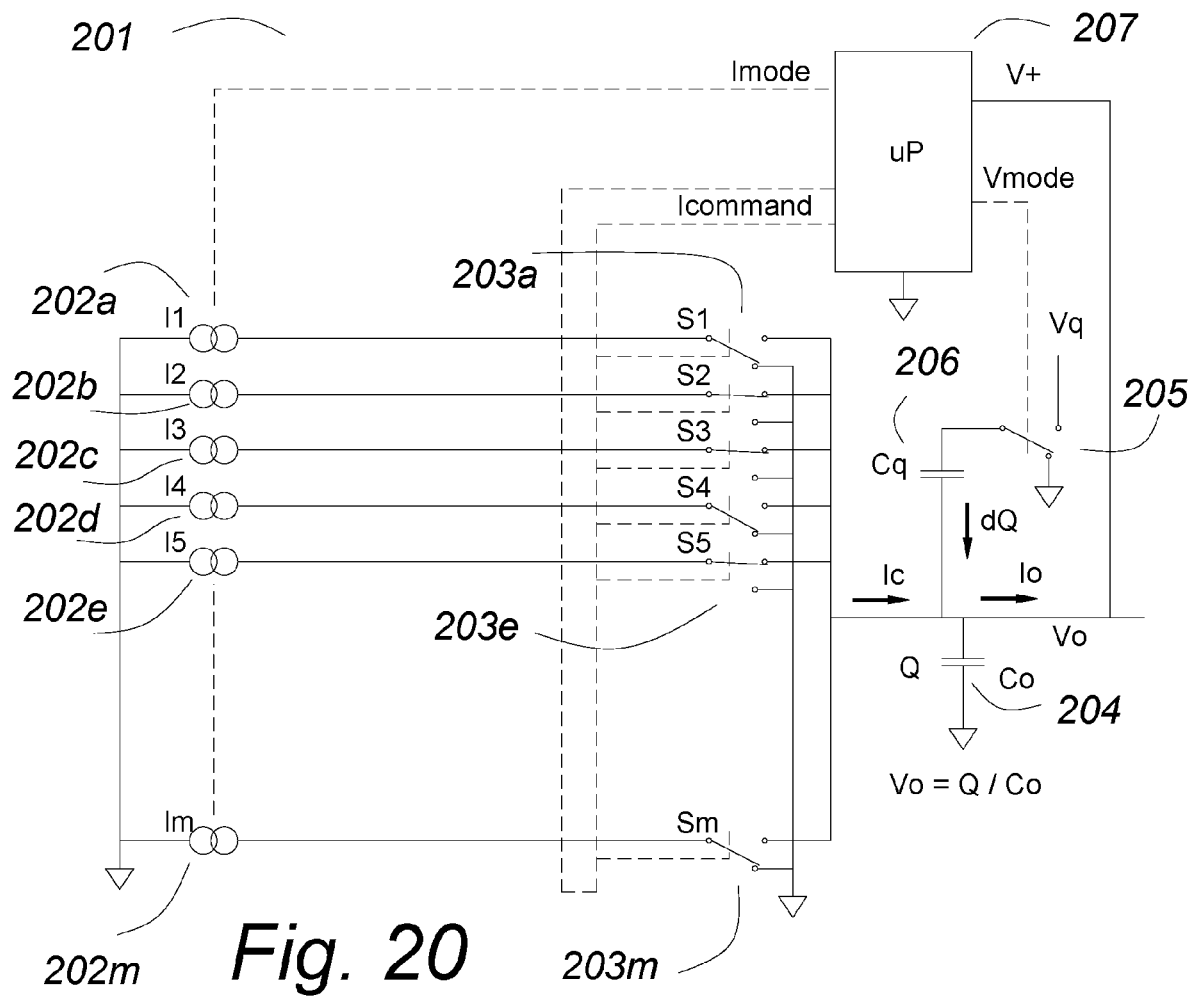
FIG. 20 shows a switched-current power converter further comprising a switched-charge auxiliary circuit, for very rapid step change of the output voltage.

FIG. 20 shows a switched-current power converter 201 further comprising a switched-charge circuit.

A plurality of constant current sources 202a–202m generate several parallel currents I1-Im. A plurality of switches 203a–203m switch the plurality of currents I1-Im to return or to an output capacitor 204. A switched charge circuit comprising a charge transfer capacitor 206 and a charge transfer switch 205 can inject into, or remove charge from, the output capacitor 204.

FIG. 20 further shows that a microprocessor 207 can control the operation of the switched-current and switched-charge circuits. It is contemplated that there would be voltage sensing and control functions embedded in the microprocessor 207, or, alternatively, on a voltage sense and control sub-circuit within the microprocessor package.

The Icommand function is a data bus that controls the position of the plurality of switches 203a–203m. This control could be in response to an error in the voltage V+ to the microprocessor 207, or it could be in anticipation of a change in current demand.

The Imode function controls the magnitude of the current in the constant current sources 202a–202m. When very fast changes in input current are needed, the Icommand function is used, but there may be reduced current states from which a slower "wake up" may be acceptable. For these reduced current states, the magnitude of the constant current sources 202a–202m should be reduced, to reduce losses due to the circulating currents.

Finally, the Vmode function can command a step change in the input voltage V+ to the microprocessor 207. Operation is as explained above for FIG. 19. A single charge transfer switch 205 and charge transfer capacitor 206 are shown, which can produce a single step up or down. Additional charge transfer switches and charge transfer capacitors can be added, and they may have a binary relationship. With a pair, four voltage steps are possible, and with four, sixteen steps are possible.

The figures and discussions in this specification have used simplified schematics to show the heart of the inventions. One skilled in the art of power converters would be able to used these simplified schematics to build practical power converters, substituting solid state switches such as MOSFETs for the switch symbol, and substituting paralleled buck converters or matrix transformer elements where constant current sources are required. Voltage sensing circuits, snubbers, filters, rectifiers or synchronous rectifiers frequency compensation and so forth may have to be added to make practical power converters, all of which would be well known and readily accomplished by one skilled in the art of power conversion.

What is claimed is:

1. A switched-current power converter comprising a quantity m (where m is a positive integer) of constant current sources,
   a quantity m of switching means, and
   an output capacitor having a first terminal and a second terminal,
   the second terminal of the output capacitor being connected to return,
   the m constant current sources each having a current input that is connected to return,
   the m constant current sources each having a current output,
   the m constant current sources having equal currents,
   the m switching means each having a switch input that is connected to the current output of one of the m constant current sources,
   the m switching means each having a first switch output that is connected to return,
   the m switching means each having a second switch output that is connected to the first terminal of the output capacitor,
   the m switching means each having a first switch state in which the current from the one of the m constant current sources to which it is connected is switched to return, and
   the m switching means each having a second switch state in which the current from the one of the m constant current sources to which it is connected is switched to the output capacitor
   further comprising an output voltage control means for operating the m switching means in response of the state of a voltage on the output capacitor
   wherein the voltage control means comprises a first comparator means responsive to an over voltage state of the voltage on the output capacitor, and
   a second comparator means responsive to an under voltage state of the voltage on the output capacitor,
   an up-down counter means and
   a quantity m of switch driver means,
   each of the m switch driver means being connected to one of the switching means for controlling the state of the m switching means,
   the m switch driver means being responsive to a count of the up-down counter,
   the up-down counter means being responsive to the first and second comparator means
   such that if there is an under voltage condition of the voltage on the output capacitor, the count of the up-down counter means will increase and more of the m switching means will be in the second switch state, and
   if there is an over voltage condition of the voltage on the output capacitor, the count of the up-down counter means will decrease and fewer of the m switching means will be in the second switch state.

2. A switched-current power converter comprising
   a quantity m (where m is a positive integer) of constant current sources,
   a quantity m of switching means, and
   an output capacitor having a first terminal and a second terminal,
   the second terminal of the output capacitor being connected to return,
   the m constant current sources each having a current input that is connected to return,
   the m constant current sources each having a current output,
   the m constant current sources having equal currents,
   the m switching means each having a switch input that is connected to the current output of one of the m constant current sources,
   the m switching means each having a first switch output that is connected to return,
   the m switching means each having a second switch output that is connected to the first terminal of the output capacitor,
   the m switching means each having a first switch state in which the current from the one of the m constant current sources to which it is connected is switched to return, and
   the m switching means each having a second switch state in which the current from the one of the m constant current sources to which it is connected is switched to the output capacitor
   further comprising an output voltage control means for operating the m switching means in response of the state of a voltage on the output capacitor
   wherein the voltage control means comprises a first voltage reference and a resistor divider network connected to the first voltage reference so as to establish a quantity m of comparator reference voltages,
   a quantity m of comparator means,
   each of the m comparator means being responsive to the voltage on the output capacitor and to one of the m comparator reference voltages,
   each of the m comparator means being connected to one of the m switching means and operating the one of the m switching means such that
   if the voltage on the output capacitor is higher than any one of the m comparator reference voltages to which the any one of the m comparator means is responsive, then the switching means to which the any one of the m comparators is connected will be in the first switch state, and
   if the voltage on the output capacitor is lower than any one of the m comparator reference voltages to which any one of the m comparator means is responsive, then the switching means to which the any one of the m comparator means is connected will be in the second switch state.

3. The switched-current power converter of claim 2, wherein each of the m comparator means has hysteresis.

4. The switched-current power converter of claim 3
   further comprising a voltage stabilization circuit responsive to a second reference voltage and the voltage on the output capacitor,
   the voltage stabilization being connected to the resistor divider network to adjust the m comparator reference voltages so as to maintain the voltage on the output capacitor at a correct voltage.

5. A switched-current power converter comprising
a quantity m (where m is a positive integer) of constant current sources,
a quantity m of switching means, and
an output capacitor having a first terminal and a second terminal,
the second terminal of the output capacitor being connected to return,
the m constant current sources each having a current input that is connected to return,
the m constant current sources each having a current output,
the m constant current sources having equal currents,
the m switching means each having a switch input that is connected to the current output of one of the m constant current sources,
the m switching means each having a switch output that is connected to the first terminal of the output capacitor,
the m switching means each having a first switch state in which the switching means is an open circuit,
the m switching means each having a second switch state in which the current from the one of the m constant current sources to which it is connected is switched to the output capacitor,
the m constant current means each having an internal switching means,
the internal switching means each having a first internal switch state in which the current output of the constant current means is internally short circuited whenever the respective one of the m switching means is in its first switch state, and
the internal switching means each having a second internal switch state in which the current output of the constant current means is not short circuited whenever the respective one of the m switching means is in its second switch state.

6. The switched-current power converter of claim 5
wherein the m constant current sources are m elements of a matrix transformer,
each of the m elements of the matrix transformer having first and second synchronous rectifier switching means,
and wherein the first internal switch state is accomplished by closing both the first and the second synchronous rectifier switching means.

7. The switched current power converter of claim 5
further comprising an output voltage control means for operating the m switching means in response of the state of a voltage on the output capacitor
wherein the voltage control means comprises a first comparator means responsive to an over voltage state of the voltage on the output capacitor, and
a second comparator means responsive to an under voltage state of the voltage on the output capacitor,
an up-down counter means and
a quantity m of switch driver means,
each of the m switch driver means being connected to one of the switching means for controlling the state of the m switching means,
the m switch driver means being responsive to a count of the up-down counter,
the up-down counter means being responsive to the first and second comparator means
such that if there is an under voltage condition of the voltage on the output capacitor, the count of the up-down counter means will increase and more of them switching means will be in the second switch state, and
if there is an over voltage condition of the voltage on the output capacitor, the count of the up-down counter means will decrease and fewer of the m switching means will be in the second switch state.

8. The switched current power converter of claim 6
further comprising an output voltage control means for operating the m switching means in response of the state of a voltage on the output capacitor
wherein the voltage control means comprises a first voltage reference and a resistor divider network connected to the first voltage reference so as to establish a quantity m of comparator reference voltages,
a quantity m of comparator means,
each of the m comparator means being responsive to the voltage on the output capacitor and to one of the m comparator reference voltages,
each of the m comparator means being connected to one of the m switching means and operating the one of the m switching means such that
if the voltage on the output capacitor is higher than any one of the m comparator reference voltages to which the any one of the m comparator means is responsive, then the switching means to which the any one of the m comparators is connected will be in the first switch state, and
if the voltage on the output capacitor is lower than any one of the m comparator reference voltages to which any one of the m comparator means is responsive, then the switching means to which the any one of the m comparator means is connected will be in the second switch state.

9. The switched-current power converter of claim 8, wherein each of the m comparator means has hysteresis.

10. The switched-current power converter of claim 9
further comprising a voltage stabilization circuit responsive to a second reference voltage and the voltage on the output capacitor,
the voltage stabilization being connected to the resistor divider network to adjust the m comparator reference voltages so as to maintain the voltage on the output capacitor at a correct voltage.

* * * * *